UNITED STATES PATENT OFFICE.

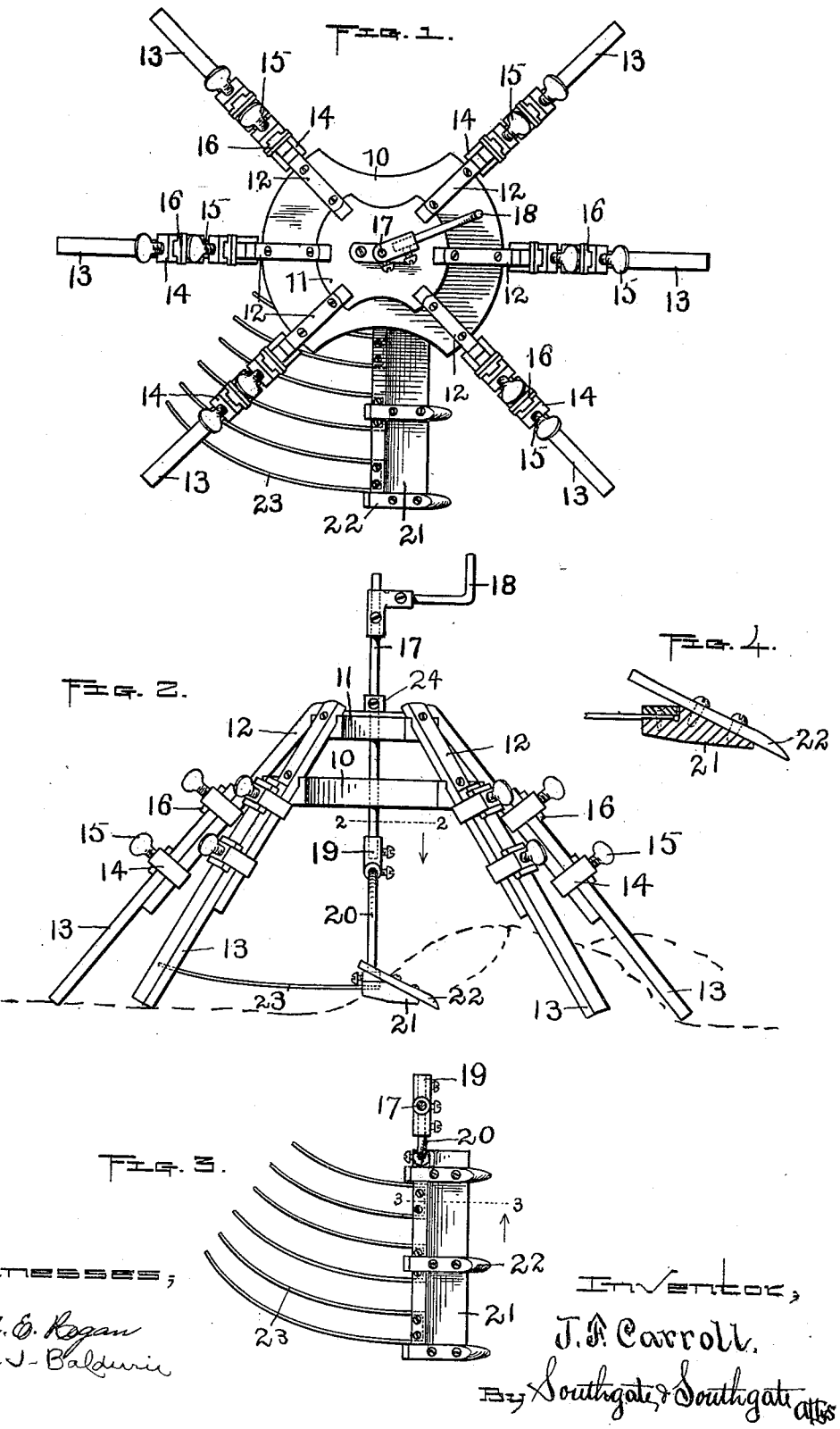

JOHN F. CARROLL, OF WORCESTER, MASSACHUSETTS.

VEGETABLE-DIGGING MACHINE.

SPECIFICATION forming part of Letters Patent No. 623,767, dated April 25, 1899.

Application filed December 19, 1898. Serial No. 699,631. (No model.)

*To all whom it may concern:*

Be it known that I, JOHN F. CARROLL, a citizen of the United States, residing at Worcester, in the county of Worcester and State of Massachusetts, have invented a new and useful Vegetable-Digging Machine, of which the following is a specification.

The object of my present invention is to provide a light, strong, simple, and efficient machine for digging vegetables from the ground and for practically freeing said vegetables from dirt.

To these ends my invention consists of the parts and combinations of parts, as hereinafter described and more particularly pointed out in the claims at the end of this specification.

In the accompanying drawings, Figure 1 is a plan view of a digging-machine constructed according to my invention. Fig. 2 is a side view of the same. Fig. 3 is a detail plan view of the digging-blade, taken on the line 2 2 of Fig. 2; and Fig. 4 is a sectional view thereof, taken on the line 3 3 of Fig. 3.

Potatoes and other vegetables are now ordinarily dug up from the ground either by hand or are plowed out by movable plowing or digging machines. Hand-digging is laborious and slow work, while traveling plowing or digging machines do not do the work thoroughly and are apt to bruise and spoil the potatoes or other vegetables being dug. The especial object of my present invention is therefore to provide a stationary digging-machine which may be set in position to dig the potatoes or other vegetables from the hill or earth where the same are planted and which may be employed for digging the vegetables without jamming or bruising the same and which will practically free the vegetables from the earth, so that they can be readily picked up. When one hill or place where the vegetables have been planted has been dug, the apparatus may be moved and set in position on another hill. To accomplish these purposes, a digging-machine constructed according to my invention comprises a frame, an upright shaft journaled and vertically movable in said frame, and a digging-blade carried by an arm extending radially from the upright shaft. The surface of the digging-blade is preferably inclined and is also provided with inclined teeth or points, so that as the blade is turned it will plow down into the dirt to the desired depth. The distance to which the digging-blade is allowed to sink itself in the ground may be limited by a stop on the upright shaft, or the handle employed for turning the upright shaft may be adjusted to form a stop for this purpose. After the blade has seated itself in the ground and is turned the vegetable will be dug or turned up, and the dirt will be practically freed therefrom by means of a receiving-frame or rods carried by the digging-blade.

Referring to the drawings and in detail, the frame of the machine as illustrated comprises two plates or platforms 10 and 11. Mortised into or otherwise secured to the plates 10 and 11 are a plurality of inclined legs 12. Each of the inclined legs 12 is provided with an adjustable lower section or foot-piece 13. The legs 12 are adjustably connected to their lower sections by means of clamping-frames 14, which are secured to the inclined legs 12 and are provided with clamp-screws 15 and followers 16 for engaging the adjustable sections 13.

Journaled and vertically movable in the frame of the machine is an upright shaft 17. Secured on the lower end of the shaft 17 is a socket-piece 19, carrying a radially downwardly-extending arm 20, secured on which arm 20 is a digging-blade 21. The digging-blade 21 is preferably provided with a plurality of sharpened teeth or points 22, and extending rearwardly from the digging-blade 21 is a receiving-frame formed by curved rods or bars 23.

Secured on the upper end of the shaft 17 is an operating-handle 18, and also preferably adjustably secured on the shaft 17 is a stop 24.

The legs of a digging-machine as thus constructed may be adjusted so that the machine will stand substantially upright and in proper position with relation to a hill or row which is to be dug, the operation of the machine being indicated by dotted lines in Fig. 2.

I am aware that changes may be made in the construction of my digging-machine by those who are skilled in the art without departing from the scope of my invention as expressed in the claims. I do not wish, therefore, to be limited to the particular form which I have herein shown and described; but What I do claim, and desire to secure by Letters Patent of the United States, is—

1. In a machine for digging vegetables, the combination of a frame, an upright vertically-movable shaft journaled in said frame, and a digging-blade carried by said shaft, said digging-blade being provided with inclined teeth or points and with rearwardly-extending curved rods, substantially as described.

2. In a machine for digging vegetables, the combination of a frame comprising plates 10 and 11, and a plurality of inclined legs 12 having adjustable end sections 13, an upright vertically-movable shaft 17 journaled in said frame, a radial digging-blade 21 carried by said shaft, a handle 18 for turning said shaft, and means for limiting the depth to which the digging-blade may seat itself in the earth, substantially as described.

In testimony whereof I have hereunto set my hand in the presence of two subscribing witnesses.

JOHN F. CARROLL.

Witnesses:
  LOUIS W. SOUTHGATE,
  PHILIP W. SOUTHGATE.